Sept. 10, 1929.  G. L. TULLY  1,727,455

OPHTHALMIC MOUNTING

Filed May 18, 1928

G. L. TULLY Inventor

By Harry H. Styll

Attorney

Patented Sept. 10, 1929.

1,727,455

UNITED STATES PATENT OFFICE.

GEORGE L. TULLY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed May 18, 1928. Serial No. 278,784.

This invention relates to improvements in ophthalmic mountings and has particular reference to new and improved means of positioning and holding a prescription lens in relation to a protection lens in said mounting.

The principal object of this invention is to provide improved means for holding the prescription lens in the mounting in such a way that it may readily be removed or inserted.

Another object of this invention is to provide means in the mounting to prevent the prescription lens from turning.

Another object is to provide means whereby the protection lens will hold and retain the prescription lens in place.

Another object is to provide a definite position for the prescription lens without auxiliary attachments on same.

Another object is to provide inexpensive means of holding a prescription lens in such a mounting.

Other objects and advantages of the invention will become apparent from the following description taken in connection with the accompanying drawings, and it will be apparent that many changes may be made in the details of construction and arrangement of parts without departing from the spirit of the invention as expressed in the accompanying claims. I, therefore, do not wish to be limited to the exact details of construction and arrangements shown and described, as the preferred forms only have been shown by way of illustration.

In the accompanying drawings:—

Figure 1:
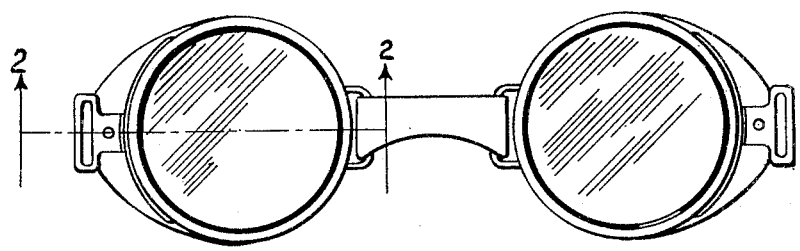
Fig. 1 is a front view of an ophthalmic mounting embodying the invention.
Figure 2:
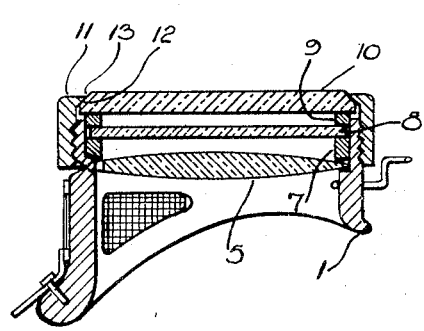
Fig. 2 is a section on line 2—2 of Fig. 1.
Figure 3:
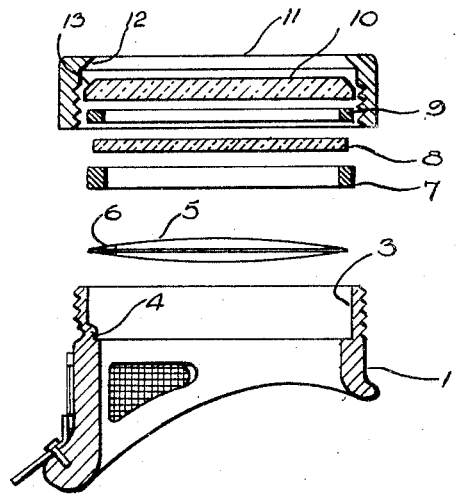
Fig. 3 is a section on line 2—2 of Fig. 1 showing the various parts separated.
Figure 4:
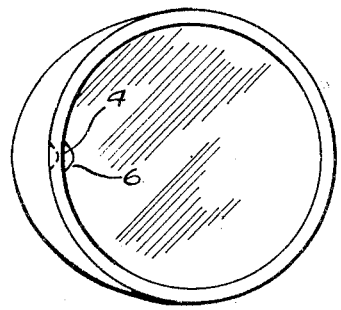
Fig. 4 is a front view of the cup with the cap removed.

Experience has shown that workmen using protection mountings have, in a number of cases, needed their ocular correction incorporated in the lenses. In cases where a cylindrical lens power is required it is important that the prescription lens be held to axis without turning. Therefore it is the principal object of my invention to provide simple, efficient and inexpensive means for positioning a prescription lens in a mounting having a protection lens as well so that it will be held securely to axis. By a novel and ingenious means I have accomplished this and the prescription lens may be taken out for cleaning and replaced in exactly the same position without mistake.

The drawings have similar reference characters to denote corresponding parts throughout and the eye-cup 1 made of molded fiber or some similar material has a screw thread cut on its outer surface adjacent its outer end. A recess 3 or seat is bored or otherwise made to a convenient depth and diameter on its inner surface adjacent the outer end of the cup. At the lower end of the recess 3 is a projection 4 being preferably a struck up part of the molded eye-cup. This projection is preferably directly over the temple side of the eye-cup or otherwise definitely located. The prescription lens 5 fits in the recess 3 and has a nick 6 to fit around the projection 4. The position of the nick 6 on the edge of the prescription lens, is fixed by the location of the projection 4 in the eye-cup. This device forms a simple and efficient means of holding the lens to axis where a cylinder lens is used. A distance washer 7 of some resilient material fits over the prescription lens and above the washer 7 is the protection lens 8 preferably of ferrous iron or other heat retarding glass.

Another distance washer 9 similar to 7 is placed above the protection lens 8, and a cover glass lens 10 surmounts all to protect the expensive ferrous iron lens from damage and scratch. A cap 11 screws on the eye-cup and firmly holds the loose parts in position. This cap 11 has an inclined face 12 which impinges on a similar face 13 of the protective cover glass lens 10. In the assembly of the protection mounting it is only necessary to fit the prescription lens 5 correctly in the eye-cup, by having the nick 6 fit around the projection 4, to prevent the prescription lens from turning and to obtain a correct axial position for a cylinder lens where same is used. The distance washers 7 and 9 permit a prescription lens of convex shape to be used without interference with the parts mounted above. The inclined face 13 of the protection lens forms a substantial and neat seat for the cap 11. This construction facilitates the manufacture of the cap by its simplicity, whilst giving a rigid assembly when screwed down.

It will be understood that a rigid bridge for connecting the eye-cups will be preferable to a flexible bridge where cylindrical lenses are used.

From the foregoing description it will be seen that I have supplied an economical and efficient means of carrying out all the objects of the invention and especially of providing a prescription lens without superfluous and expensive attachments to hold it in position without turning.

Having described my invention, I claim:

1. In a device of the character described, an annular eye cup having a threaded portion adjacent one end and having a lens seat therein adjacent said end, a lens on the lens seat, interengaging members on the cup and lens to prevent the lens turning in the seat, a distance ring over the lens, a second lens over the distance ring, and a threaded cap engaging the threaded portion of the eye cup to hold the lenses in the seat.

2. In a device of the character described, an annular eye cup having a threaded portion adjacent an end and an annular lens seat therein adjacent one end, a struck-up indent extending into the field of the seat, a lens on the seat having a recess fitting around the indent, a distance ring over the lens, a second lens over the distance ring, and a screw threaded cap engaging the threaded portion of the cup to hold the lenses in place.

3. In a device of the character described, an annular eye cup having an annular seat therein adjacent one end, a threaded portion surrounding the seat, a struck-up indent extending into the field of the seat, a lens on the seat engaging the struck-up indent and being thereby prevented from turning, a pair of distance rings over the lens having a second lens therebetween, a third lens surmounting the other two and separated therefrom by the distance rings, and a threaded cap engaging the threaded portion of the eye cup and adapted to be screwed down thereon to retain all the lenses and distance rings in rigid relation within the eye cup.

4. In a device of the character described, an eye cup having a lens seat therein, a threaded portion surrounding the seat, a lens on the seat, a pair of distance rings over the lens having a second lens therebetween, a third lens surmounting the other two and separated therefrom by the distance rings, an inclined portion on the third lens, and a threaded cap engaging the threaded portion of the eye cup and the inclined portion of the third lens to retain all the lenses and distance rings in rigid relation within the eye cup.

5. In a device of the character described, an eye cup having a lens seat therein, a struck-up indent extending into the field of the seat, a lens on the seat having a recess engaging the struck-up indent and being thereby prevented from turning, a pair of distance rings over the lens having a second lens therebetween, a third lens surmounting the other two and separated therefrom by the distance rings, an inclined portion on the third lens, and a cap member engaging the eye cup and the inclined portion of the third lens to retain all the lenses and distance rings in rigid relation within the eye cup.

GEORGE L. TULLY.